(12) United States Patent
Yoshiura et al.

(10) Patent No.: US 11,739,680 B2
(45) Date of Patent: *Aug. 29, 2023

(54) VEHICLE THERMAL ENERGY CONTROL SYSTEM

(71) Applicant: TOYOTA JIDOSHA KABUSHIKI KAISHA, Toyota (JP)

(72) Inventors: Takahito Yoshiura, Toyokawa (JP); Daisuke Kobayashi, Kasugai (JP); Yoichiro Higuchi, Suzuka (JP); Yasushi Kusaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 131 days.

This patent is subject to a terminal disclaimer.

(21) Appl. No.: 17/206,641

(22) Filed: Mar. 19, 2021

(65) Prior Publication Data

US 2021/0207519 A1 Jul. 8, 2021

Related U.S. Application Data

(63) Continuation of application No. 16/242,467, filed on Jan. 8, 2019, now Pat. No. 10,982,583.

(30) Foreign Application Priority Data

Feb. 7, 2018 (JP) .................... 2018-020271

(51) Int. Cl.
*F01P 3/20* (2006.01)
*B60H 1/00* (2006.01)
(Continued)

(52) U.S. Cl.
CPC ............ *F01P 3/20* (2013.01); *B60H 1/004* (2013.01); *B60H 1/00385* (2013.01);
(Continued)

(58) Field of Classification Search
CPC ........... B60H 1/00885; B60H 1/00385; B60H 1/00392; B60H 1/00271; B60H 1/00642;
(Continued)

(56) References Cited

U.S. PATENT DOCUMENTS 8,612,092 B2 * 12/2013 Okamoto ........... B60H 1/00764
237/12.3 R
10,163,277 B2 * 12/2018 Light-Holets ....... F02N 11/0803
(Continued)

FOREIGN PATENT DOCUMENTS

CN 102301113 A 12/2011
CN 105848957 A 8/2016
(Continued)

*Primary Examiner* — Kun Kai Ma
(74) *Attorney, Agent, or Firm* — Oliff PLC

(57) ABSTRACT

A vehicle thermal energy control system that is able to achieve improved heat management in the entirety of a vehicle is provided. A thermal energy control system is provided in a vehicle and includes heat sources and a heat amount distributor configured to assign a demanded heat amount calculated from heat demands generated in the entirety of the vehicle, to each heat source on the basis of a suppliable heat amount of each heat source.

11 Claims, 3 Drawing Sheets

(51) Int. Cl.
*F01P 7/02* (2006.01)
*F01P 7/16* (2006.01)
*F01P 5/12* (2006.01)

(52) U.S. Cl.
CPC ..... *B60H 1/00392* (2013.01); *B60H 1/00885* (2013.01); *F01P 7/02* (2013.01); *B60H 1/00271* (2013.01); B60H 2001/00307 (2013.01); B60L 2240/34 (2013.01); B60L 2240/36 (2013.01); B60L 2240/445 (2013.01); B60L 2240/545 (2013.01); B60L 2270/44 (2013.01); B60L 2270/46 (2013.01); *F01P 7/165* (2013.01); *F01P 2005/125* (2013.01); *F01P 2025/08* (2013.01); *F01P 2060/02* (2013.01)

(58) Field of Classification Search
CPC . B60H 1/22; B60H 1/143; B60H 1/08; B60H 1/004; B60H 2001/00307; F01P 7/02; F01P 2025/08; F01P 3/20; B60L 2270/44; B60L 2270/46; B60L 2240/545; B60L 2240/445; B60L 2240/36; B60L 2240/34
See application file for complete search history.

(56) References Cited

U.S. PATENT DOCUMENTS

| | | | |
|---|---|---|---|
| 10,556,484 B2 * | 2/2020 | Blatchley | B60H 1/00821 |
| 2008/0269009 A1 | 10/2008 | Marr et al. | |
| 2010/0126438 A1 * | 5/2010 | Kim | F01P 9/06 |
| | | | 165/104.26 |
| 2010/0312425 A1 | 12/2010 | Obayashi et al. | |
| 2011/0004392 A1 * | 1/2011 | Senda | F02P 5/1516 |
| | | | 701/102 |
| 2011/0109157 A1 * | 5/2011 | Tani | B60H 1/00735 |
| | | | 60/660 |
| 2011/0166711 A1 * | 7/2011 | Markowitz | B60H 1/00885 |
| | | | 165/203 |
| 2012/0074238 A1 * | 3/2012 | Morita | F02D 29/04 |
| | | | 237/5 |
| 2012/0174585 A1 * | 7/2012 | Rampen | F02G 1/043 |
| | | | 60/682 |
| 2012/0179329 A1 * | 7/2012 | Okamoto | B60H 1/00899 |
| | | | 701/36 |
| 2014/0075966 A1 * | 3/2014 | Schmitz | B60H 1/00921 |
| | | | 165/42 |
| 2016/0159204 A1 * | 6/2016 | Katoh | B60H 1/32284 |
| | | | 62/185 |
| 2016/0221417 A1 * | 8/2016 | Ito | B60H 1/2218 |
| 2016/0318409 A1 | 11/2016 | Rawlinson | |
| 2016/0318499 A1 | 11/2016 | Yamanaka et al. | |
| 2016/0332505 A1 * | 11/2016 | Yamanaka | B60L 1/003 |
| 2016/0372768 A1 * | 12/2016 | Procter | H01M 8/04529 |
| 2017/0260894 A1 | 9/2017 | Auerbach et al. | |
| 2017/0369080 A1 | 12/2017 | Mijin | |
| 2018/0264913 A1 * | 9/2018 | Enomoto | B60H 1/32284 |

FOREIGN PATENT DOCUMENTS

| | | | | |
|---|---|---|---|---|
| CN | 107107920 A | | 8/2017 | |
| JP | 2008-296646 A | | 12/2008 | |
| JP | 2010-090729 A | | 4/2010 | |
| JP | 2010-525981 A | | 7/2010 | |
| JP | 2010-280335 A | | 12/2010 | |
| JP | 2011-201488 A | | 10/2011 | |
| JP | 2011-201489 A | | 10/2011 | |
| JP | 2011201488 A | * | 10/2011 | ......... B60H 1/00007 |
| JP | 2011201489 A | * | 10/2011 | ......... B60H 1/00007 |
| JP | 2012-140111 A | | 7/2012 | |
| JP | 2015-131597 A | | 7/2015 | |

* cited by examiner

VEHICLE THERMAL ENERGY CONTROL SYSTEM

This is a continuation application of U.S. patent application Ser. No. 16/242,467, filed Jan. 8, 2019, which claims priority to JP 2018-020271, filed on Feb. 7, 2018. The disclosures of each application are hereby incorporated by reference in their entireties.

BACKGROUND OF THE INVENTION

Field of the Invention

The present disclosure relates to a vehicle thermal energy control system that assigns a demanded heat amount to heat sources on the basis of a plurality of heat demands generated in a vehicle.

Description of the Background Art

Japanese Laid-Open Patent Publication No. 2011-201488 describes a heat source control apparatus in which cooling water for an engine and a heat pump are used as a heat source for heating the interior of a vehicle. In the heat source control apparatus described in Japanese Laid-Open Patent Publication No. 2011-201488, distribution of an amount of heat to be supplied from the cooling water for the engine through a heater core to the air in the interior of the vehicle and an amount of heat to be supplied from an interior heat exchanger of a heat pump system to the air in the interior of the vehicle is determined such that heat cost (amount of fuel) to be consumed is minimized.

Recent vehicles are equipped with various devices that use heat, and thus heat management thereof is complicated as compared to that of a conventional vehicle. However, at present, heat management in the entire vehicle cannot be considered to be sufficiently optimized.

SUMMARY OF THE INVENTION

Therefore, the present disclosure provides a vehicle thermal energy control system that is able to achieve improved heat management in the entirety of a vehicle.

A thermal energy control system according to the present disclosure includes a heat source and a heat amount distributor configured to assign a demanded heat amount calculated from a heat demand generated in an entirety of a vehicle, to the heat source on the basis of a suppliable heat amount of the heat source.

According to the present disclosure, it is possible to provide a vehicle thermal energy control system that is able to achieve improved heat management in the entirety of a vehicle.

DESCRIPTION OF THE PREFERRED EMBODIMENTS (Outline)

In the thermal energy control system according to the present disclosure, in consideration of suppliable heat amounts of heat sources such as a heat generator and a heat exchanger included in a vehicle, a demanded heat amount is distributed to each heat source. Therefore, improved heat management in the entirety of the vehicle can be achieved in consideration of an amount of heat to be generated by the heat generator, an amount of heat to be discharged from the heat exchanger, an amount of heat to be stored in a heat medium of the heat exchanger, etc.

First Embodiment

<Configuration>

Figure 1:
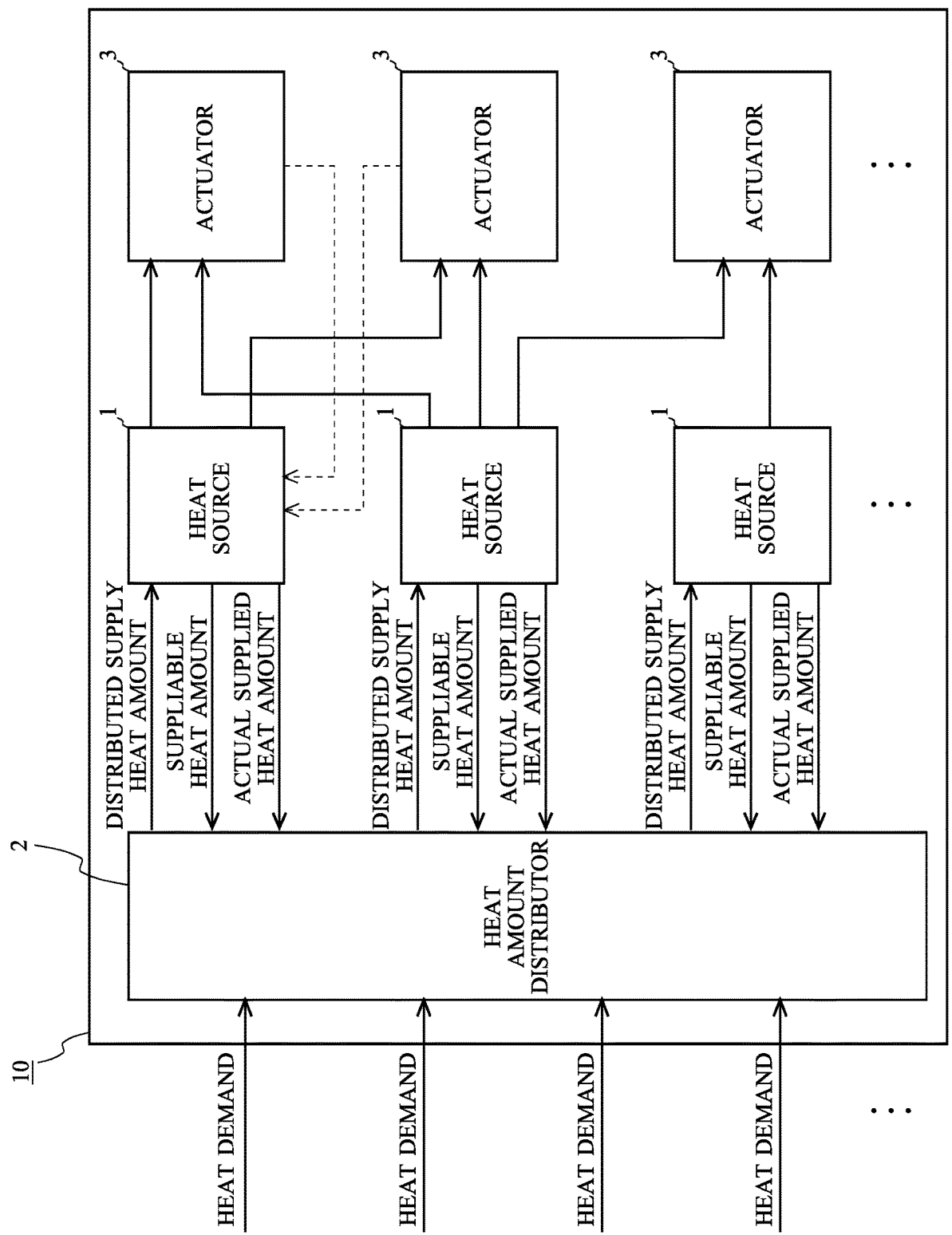
FIG. 1 is a functional block diagram showing a schematic configuration of a thermal energy control system according to a first embodiment.

FIG. 1 is a functional block diagram showing a schematic configuration of a thermal energy control system according to a first embodiment.

The thermal energy control system 10 includes a plurality of heat sources 1, a heat amount distributor 2, and a plurality of actuators 3.

Examples of the heat sources 1 include heat generators and heat exchangers. A heat generator is a device that generates heat by operating. Examples of heat generators include an engine, a heat pump, a traction motor for a hybrid vehicle, an electric vehicle, or the like, a power control unit for the traction motor, and a drive battery for the traction motor. A heat exchanger is a device for exchanging thermal energy between two different heat media. Examples of heat exchangers include a radiator, an intercooler, an oil cooler, a heater core, a waste heat collector, and an outdoor heat exchanger of a heat pump. Each heat source 1 calculates a suppliable heat amount, which is a maximum amount of heat that can be supplied, and an actual supplied heat amount, which is an amount of heat actually supplied, on the basis of the operating state of the heat source 1 and the operating state of the later-described actuator 3, and outputs the calculated suppliable heat amount and actual supplied heat amount to the later-described heat amount distributor 2. In the case where the heat source 1 is a heat generator, a supplied heat amount of the heat source 1 corresponds to an amount of heat generated. In the case where the heat source 1 is a heat exchanger, a supplied heat amount of the heat source 1 corresponds to an amount of heat discharged. The heat source 1 includes a computer such as an ECU that is not shown, and each of later-described processes is performed by the computer. In the present embodiment, the plurality of heat sources 1 are provided, but the number of heat sources 1 included in the thermal energy control system 10 may be one.

The heat amount distributor 2 acquires a plurality of heat demands generated in the entirety of a vehicle, and distributes a demanded heat amount, which is calculated from the plurality of heat demands acquired, to each heat source 1 on the basis of the demanded heat amount and the suppliable heat amount acquired from each heat source 1. Heat demands generated in the entirety of the vehicle are demands for heat amounts required by various devices provided in the vehicle, and required heat amounts can take both positive and negative values. Examples of heat demands generated in the vehicle include a demand for a positive or negative heat amount required for heating or cooling an engine, a traction motor, a traction battery, or the like to an optimum temperature, a demand for a positive or negative heat amount required for increasing or decreasing the air temperature in the interior of the vehicle to a set temperature of an air-conditioner, and a demand for a positive heat amount required for storing heat in a heat medium of each of various cooling systems or for a negative heat amount required for cooling the heat medium to a predetermined temperature.

The heat amount distributor 2 requests each heat source 1 to supply thermal energy such that each of the acquired heat demands can be satisfied. For example, when a heat amount for increasing the air temperature in the interior of the vehicle to a predetermined temperature is demanded from an air-conditioner, the heat amount distributor 2 distributes the heat amount demanded from the air-conditioner, to the engine or the heat pump. In distributing the demanded heat amount to each heat source 1, the heat amount distributor 2 takes the suppliable heat amount of each heat source 1 into consideration. For example, when the suppliable heat amount of the engine is smaller than the heat amount demanded from the air-conditioner, the heat amount distributor 2 distributes the entirety of the heat amount demanded from the air-conditioner, to the heat sources 1 other than the engine, or distributes a part of the heat amount demanded from the air-conditioner, to the engine and distributes the remainder of the heat amount demanded from the air-conditioner, to the heat sources 1 other than the engine. When the demanded heat amount is distributed to each heat source 1 without consideration of the suppliable heat amount of each heat source 1, a situation can occur in which the suppliable heat amount of a certain heat source 1 is smaller than a heat amount distributed thereto and thus thermal energy supply becomes insufficient but there is excess thermal energy left in another heat source 1. The excess thermal energy is discarded, so that energy waste occurs.

On the other hand, in the thermal energy control system 10 according to the present embodiment, the heat amount distributor 2 can recognize how much margin there is for the suppliable heat amount in each heat source 1, by referring to the suppliable heat amount acquired from each heat source 1. Therefore, even when there is no margin for the suppliable heat amount of a certain heat source 1, if there is a margin for the suppliable heat amount of another heat source 1, generated thermal energy can be efficiently used by distributing the thermal energy of the other heat source 1 to the source of the heat demand. Since the heat amount distributor 2 is provided and a supplied heat amount of each heat source 1 is managed in an integrated manner by the heat amount distributor 2, improved heat management in the entirety of the vehicle can be performed. If a component capable of managing a supplied heat amount of each heat source 1 in an integrated manner, such as the heat amount distributor 2, is not present, thermal energy is individually generated and supplied by each heat source 1 such that heat demands generated in the vehicle are satisfied. Thus, there is a possibility that thermal energy left in any of the heat sources 1 is not effectively used and distribution of thermal energy in the entirety of the vehicle becomes inefficient.

Each actuator 3 is a drive device that operates in response to a command from a controller such as an ECU provided in the heat source 1, and performs control of heat output from the heat source 1, control of cooling the heat source 1, control of heat exchange between heat media, etc. Examples of the actuators 3 include various pumps for controlling the flow rate of cooling water, various valves for changing a flow path for cooling water, a fan for cooling a radiator or an outdoor heat exchanger, a compressor, and an expansion valve. In addition, the engine and the heat pump are the heat sources 1, but can also serve as actuators 3.

A plurality of the heat sources 1 output drive commands to one actuator 3 in some cases. Therefore, when each actuator 3 receives drive commands from a plurality of the heat sources 1, the actuator 3 performs a mediation process and operates according to the drive command received from any one of the heat sources 1. Specifically, each heat source 1 sets a degree of freedom for a drive command that is to be outputted to the actuator 3. The actuator 3 operates according to a drive command for which the lowest degree of freedom is set, among a plurality of drive commands received, and rejects the other drive commands. A degree of freedom to be set for a drive command is set so as to be higher as the number of actuators 3 that can be used by each heat source 1 to achieve a heat amount distributed from the heat amount distributor 2 is increased. That is, a degree of freedom for a drive command to the actuator 3 is increased as the number of alternative methods for achieving the heat amount distributed from the heat amount distributor 2 is increased.

Each actuator 3 outputs a drive amount thereof to the heat source 1 that has outputted the adopted drive command (see broken-line arrows in FIG. 1). In FIG. 1, some of feedback paths from the actuators 3 to the heat sources 1 are indicated by the broken-line arrows, and the other feedback paths are not shown. Examples of the drive amount from the actuator 3 include a voltage value, a current value, the flow velocity and the flow rate of cooling water, the rotational position of a valve, and the number of revolutions of a fan. The drive amount of the actuator 3 is used in the heat source 1 to calculate an actual supplied heat amount. Meanwhile, the actuator 3 outputs a rejection notification indicating the drive command has been rejected, to the heat source 1 that has outputted the rejected drive command. The rejection notification is used as a trigger for the heat source 1 to correct the drive command and re-output the drive command to another actuator 3.

To give a specific example, for a vehicle, a configuration may be adopted in which a fan, a radiator for an engine, and an outdoor heat exchanger of a heat pump are arranged in series in this order, and air is sent to both the radiator for the engine and the outdoor heat exchanger of the heat pump by using the same fan. As an example, the case is considered in which such a vehicle having an arrangement of a fan, a radiator, and an outdoor heat exchanger is used in a cold climate area and an engine and heating for the interior of the vehicle are started at the same time. In this case, since the engine requires warming-up, a drive command for stopping drive is outputted from the engine to an actuator of the fan. Meanwhile, since it is necessary to exchange heat between outdoor air and refrigerant having a lower temperature than the outdoor air in a heat pump of an air-conditioner, a drive command for increasing a number of revolutions can be outputted from the heat pump to the actuator of the fan. However, even when the fan is stopped, the heat pump of the air-conditioner can generate heat required for the air-conditioner, by adjustment of a compressor or an expansion valve.

Therefore, a degree of freedom that is higher than that for a drive command for stopping the fan during warming-up of the engine is set in advance for the drive command for increasing a number of revolutions from the heat pump of the air-conditioner to the fan. With this configuration, even when the actuator of the fan receives contradictory drive commands from the engine and the heat pump, the actuator performs a mediation process of determining which drive command is to be adopted, on the basis of the set degrees of freedom, and can operate on the basis of the drive command having the lowest degree of freedom. In this example, the actuator of the fan adopts the drive command for which the lowest degree of freedom is set and which is outputted from the engine, and rejects the drive command outputted from the heat pump. When the heat pump receives a rejection notification, the heat pump can attempt to achieve a supply heat amount instructed by the heat amount distributor 2, by correcting the drive command and re-outputting the drive command to another actuator (for example, a compressor or an expansion valve).

When the heat amount distributor 2 distributes a demanded heat amount to each heat source 1, the total amount of the suppliable heat amounts of all the heat sources 1 may be insufficient for the demanded heat amount (total amount) in the entirety of the vehicle. Therefore, preferably, a priority is made associated with each heat demand generated in the vehicle, and the heat amount distributor 2 determines for which heat demand a heat amount is preferentially supplied, in accordance with the priorities of acquired heat demands. A priority to be set for a heat demand can be preset on the basis of an attribute of the heat demand (for example, whether the heat demand is a heat demand required for running of the vehicle, or a heat demand required for improving comfort in the interior of the vehicle). Regarding a priority to be set for a heat demand, a priority for a heat demand required for running of the vehicle is preferably made higher than that for a heat demand required for improving comfort. When the total amount of the suppliable heat amounts of all the heat sources 1 is smaller than the demanded heat amount in the entirety of the vehicle, the heat amount distributor 2 can cancel a heat demand for which a relatively low priority is set.

As an example, the case is considered in which, in a cold climate area, the engine and heating are started at the same time and a heat demand for warming up the engine and a heat demand for heating the interior of the vehicle to a set temperature by an air-conditioner are inputted to the heat amount distributor 2. When the heat amount distributor 2 determines that the demanded heat amount in the entirety of the vehicle is smaller than the total amount of the suppliable heat amounts of all the heat sources 1 and the suppliable heat amount of the engine is smaller than a heat amount required for warming up the engine, the heat amount distributor 2 cancels the heat demand that is made by the air-conditioner and that has a relatively low priority, and assigns the suppliable heat amount of the heat pump for driving the air-conditioner, for warming up the engine.

Since the priority is preset for each heat demand as described above, the heat amounts that can be supplied by all the heat sources 1 at each time point can be assigned in order from a heat demand for which the necessity for thermal energy is relatively high, so that heat distribution can be made efficient.

In addition, the heat amount distributor 2 acquires an actual supplied heat amount actually supplied by each heat source 1. The actual supplied heat amount is calculated by the heat source 1 on the basis of the drive amount of the actuator 3. The heat amount distributor 2 corrects the heat amount distributed to each heat source 1, on the basis of the heat amount distributed to each heat source 1 and the actual supplied heat amount acquired from each heat source 1. As cases where correction is needed, a case where the heat source 1 has failed to supply the heat amount distributed to the heat source 1 by the heat amount distributor 2, a case where a deviation equal to or greater than a predetermined value has occurred between the heat amount distributed to the heat source 1 by the heat amount distributor 2 and the actual supplied heat amount due to an error factor, a case where any of the heat sources 1 has become unusable, etc., are conceivable. As necessary, the heat amount distributor 2 re-distributes the demanded heat amount to each heat source 1 and re-instructs each heat source 1 to supply heat. In the present embodiment, the drive amount of each actuator 3 is not fed back to the heat amount distributor 2 but is fed back to the heat source 1, and the heat source 1 outputs an actual supplied heat amount calculated on the basis of the drive amount of the actuator 3, to the heat amount distributor 2. For calculating the actual supplied heat amount, information for specifying the operating state of the heat source 1 is needed in addition to the drive amount of the actuator 3. Therefore, with a configuration in which the drive amount of the actuator 3 is fed back for the purpose of calculating an actual supplied heat amount in the heat amount distributor 2, the necessity to feed back the information for specifying the operating state of the heat source 1 to the heat amount distributor 2 also arises, and thus an input-output interface and a control process of the heat amount distributor 2 become complicated. In the present embodiment, since the heat source 1 calculates an actual supplied heat amount and outputs the actual supplied heat amount to the heat amount distributor 2, the input-output interface and the control process of the heat amount distributor 2 can be simplified. In addition, even in the case where a part of the heat sources 1 or the actuators 3 is changed, it becomes unnecessary to change the input-output interface and the control process of the heat amount distributor 2, and thus heat management in the entirety of the vehicle can be performed in an integrated manner without depending on the system configuration of the vehicle.

The heat amount distributor 2 preferably manages each of the heat amount demanded by the above-described heat demand, the suppliable heat amount, and the actual supplied heat amount in units of quantity of heat. In this case, a heat distribution process and a correction process (a re-distribution process) in the heat amount distributor 2 can be easily performed. However, the heat amount distributor 2 may acquire another parameter such as a temperature instead of acquiring a heat amount demanded by a heat demand from each device of the vehicle, and perform a distribution process or a correction process on the basis of the other parameter.

<Control Process>

Figure 2:
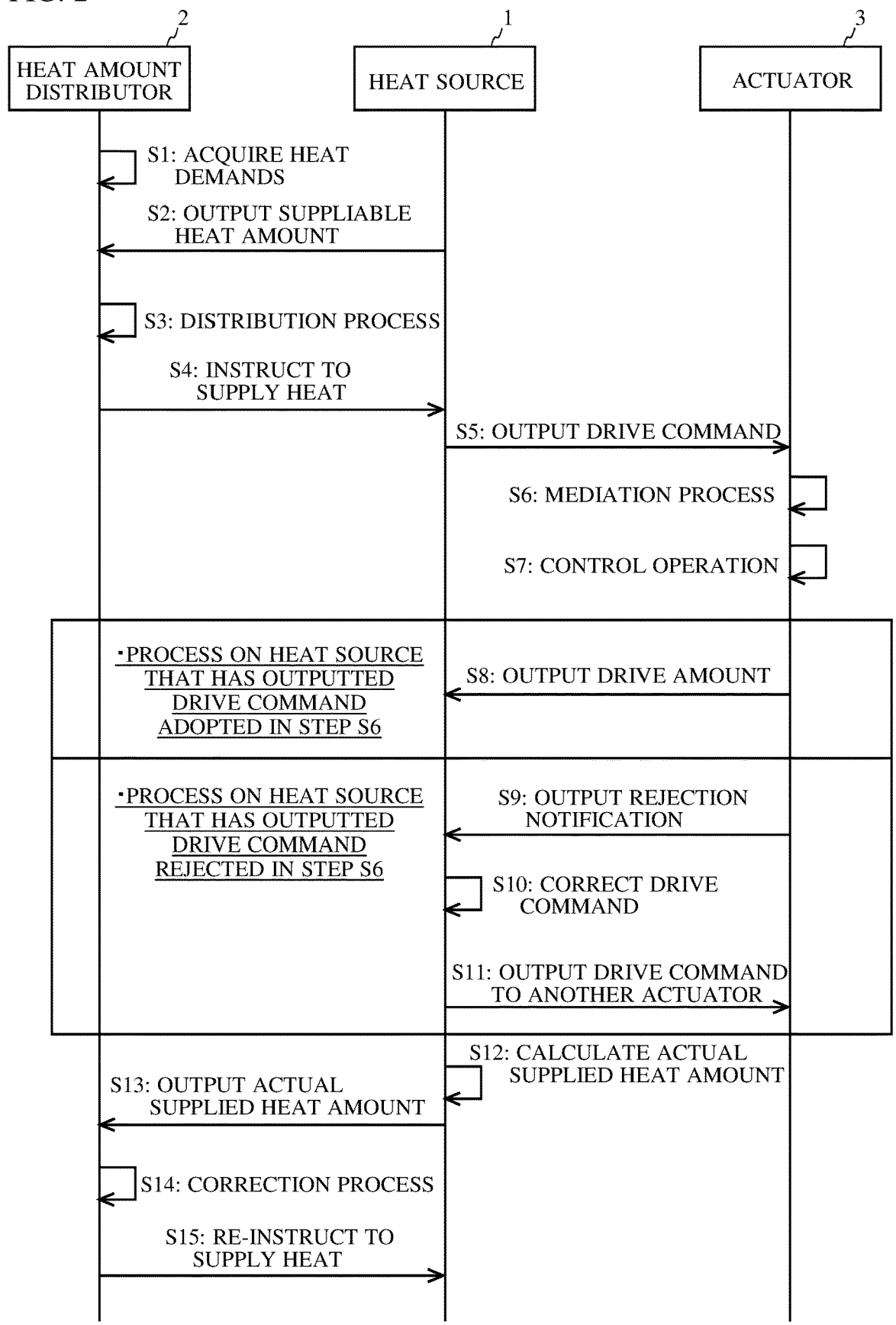
FIG. 2 is a sequence diagram illustrating a control process performed by the thermal energy control system shown in FIG. 1.

FIG. 2 is a sequence diagram illustrating a control process performed by the thermal energy control system shown in FIG. 1.

Step S1: The heat amount distributor 2 acquires heat demands generated in the entirety of the vehicle. Thereafter, the processing proceeds to step S2.

Step S2: Each of the plurality of heat sources 1 outputs a suppliable heat amount thereof to the heat amount distributor 2. The suppliable heat amount of each heat source 1 can be calculated, for example, on the basis of the operating state of the heat source 1 and the operating state of the actuator 3. Thereafter, the processing proceeds to step S3.

Step S3: The heat amount distributor 2 performs a heat amount distribution process. Specifically, the heat amount distributor 2 determines a demanded heat amount that is to be distributed to each heat source 1, on the basis of a demanded heat amount calculated from all the heat demands acquired in step S1 and the suppliable heat amount outputted from each heat source 1 in step S2. In the distribution process in step S3, as described above, a magnitude relationship between the demanded heat amount (total amount) in the entirety of the vehicle and the total amount of the suppliable heat amounts of the respective heat sources 1, a heat supply capacity based on the suppliable heat amounts of the respective heat sources 1, and the priority set for each heat demand are used. Thereafter, the processing proceeds to step S4.

Step S4: The heat amount distributor 2 instructs each heat source 1 to supply the heat amount distributed in step S3. Thereafter, the processing proceeds to step S5.

Step S5: Each heat source 1 outputs a drive command to the actuator 3 such that the heat amount distributed by the heat amount distributor 2 can be achieved. The heat source 1 that also serves as an actuator 3, such as an engine or a heat pump, controls its output by itself. Thereafter, the processing proceeds to step S6.

Step S6: When the actuator 3 receives a plurality of drive commands and the plurality of drive commands received cannot be carried out at the same time, the actuator 3 performs a mediation process. As described above, the actuator 3 refers to the degree of freedom set for each received drive command, adopts the drive command for which the lowest degree of freedom is set, and rejects the other drive commands. When the actuator 3 receives one drive command, the actuator 3 does not perform the mediation process and adopts the one drive command. In addition, when a plurality of drive commands received are not contradictory to each other, the actuator 3 adopts any of the plurality of drive commands. Thereafter, the processing proceeds to step S7.

Step S7: The actuator 3 controls operation thereof on the basis of the drive command adopted in step S6. Specifically, the actuator 3 controls the flow rate of or the flow path for cooling water, the number of revolutions of a fan, or the like. Thereafter, the processing proceeds to step S8 or S9. More specifically, the actuator 3 performs a process in step S8 on the heat source 1 that has outputted the drive command adopted in step S6, and performs a process in step S9 on each heat source 1 that has outputted the drive command rejected in step S6.

Step S8: The actuator 3 outputs a drive amount thereof after performing operation control according to the drive command, to the heat source 1 that has outputted the drive command adopted in step S6. Thereafter, the processing proceeds to step S12.

Step S9: The actuator 3 outputs a rejection notification indicating that the drive command has been rejected, to each heat source 1 that has outputted the drive command rejected in step S6. Thereafter, the processing proceeds to step S10.

Step S10: When the heat source 1 receives the rejection notification from the actuator 3, the heat source 1 corrects the drive command. More specifically, the heat source 1 determines whether the heat amount distributed by the heat amount distributor 2 can be achieved by drive of another actuator 3. When the heat source 1 determines that the distributed heat amount can be achieved by drive of another actuator 3, the heat source 1 generates a drive command for the other actuator 3. Thereafter, the processing proceeds to step S11.

Step S11: The heat source 1 outputs the re-generated drive command to the actuator 3 different from the output destination in step S5. Thereafter, the processing proceeds to step S6, and the processes in steps S6 to S11 are repeatedly performed.

Step S12: The heat source 1 calculates an actual supplied heat amount on the basis of the drive amount acquired from the actuator 3. The actual supplied heat amount can be calculated using a value detected or held by the heat source 1, in addition to the drive amount of the actuator 3. For example, in the case where the heat source 1 is an engine, and the actuator 3 is a water pump, the actual supplied heat amount can be calculated on the basis of a change in the temperature of cooling water detected by the heat source 1 and the flow rate of the cooling water acquired from the actuator 3. Thereafter, the processing proceeds to step S13.

Step S13: The heat source 1 outputs the calculated actual supplied heat amount to the heat amount distributor 2. Thereafter, the processing proceeds to step S14.

Step S14: The heat amount distributor 2 corrects (re-distributes) the heat amount distributed to each heat source 1, on the basis of the supply heat amount instructed to each heat source 1 in step S4 and the actual supplied heat amount acquired from each heat source 1. Thereafter, the processing proceeds to step S15.

Step S15: The heat amount distributor 2 instructs each heat source 1 to supply the heat amount corrected in step S14.

Thereafter, the thermal energy distribution process in the vehicle is continued by repeatedly performing the processes in steps S1 to S15 at predetermined time intervals.

The above-described heat amount distributor 2 may be realized by a dedicated circuit for performing the control process of the heat amount distributor 2 shown in FIG. 2. In addition, the above-described heat amount distributor 2 may be realized, for example, by causing a computer, such as an ECU having a processor, a ROM, a RAM, and a hard disk, to perform the processes in steps S1, S3, S4, and S13 to S15 shown in FIG. 2. Moreover, the control process of the heat source 1 shown in FIG. 2 can be realized by causing a computer, such as an ECU for controlling the heat source 1, to perform the processes in steps S5 and S8 to S12 shown in FIG. 2. Similarly, the control process of the actuator 3 shown in FIG. 2 can be realized by causing a computer on a control board or an ECU for controlling the actuator 3 to perform the processes in steps S6 and S7 shown in FIG. 2. In the case of causing a computer to perform the control process in FIG. 2, a program for the control process shown in FIG. 2 is stored in a storage device such as a ROM or a hard disk in advance, and the control process of each of the heat amount distributor 2, the heat source 1, and the actuator 3 can be performed by causing a processor included in the computer to read the program from the storage device and execute the program. Furthermore, the present invention can be considered as a thermal energy control method and a program executed by a computer, and a computer-readable non-transitory storage medium having the program stored therein.

Advantageous Effects, Etc.

In the thermal energy control system 10 according to the present embodiment, the heat amount distributor 2 assigns a demanded heat amount calculated from heat demands generated in the entirety of the vehicle, to the heat sources 1 on the basis of the suppliable heat amounts of the heat sources 1. The demanded heat amount and the supply heat amount of each heat source 1 are managed in an integrated manner by the heat amount distributor 2, whereby improved heat management in the entirety of the vehicle can be performed.

The heat demands generated in the entirety of the vehicle include heat demands generated with operation of the engine, a traction motor, a power control unit for the traction motor, a cooling/heating device for the interior of the vehicle, a drive battery for the traction motor, etc. Therefore, the heat amount distributor 2 can manage various heat demands in an integrated manner.

When a priority is set for each heat demand generated in the entirety of the vehicle, and the total amount of the suppliable heat amounts of the respective heat sources 1 is smaller than the demanded heat amount, the heat amount distributor 2 can cancel the heat demand for which a relatively low priority is set. Since a priority is set for each heat demand, thermal energy can be distributed in accordance with the total amount of the suppliable heat amounts and the level of the necessity for thermal energy.

A degree of freedom is set for a drive command that is to be outputted to the actuator 3 by each heat source 1. When the actuator 3 receives drive commands from two or more heat sources and the received drive commands cannot be carried out at the same time, the actuator 3 can operate on the basis of the drive command for which the lowest degree of freedom is set, and reject the other drive commands. Since a degree of freedom is set for a drive command from each heat source 1 to the actuator 3, even when a plurality of drive commands are contradictory to each other, the actuator 3 can be reasonably driven.

The actuator 3 outputs a rejection notification indicating that the drive command has been rejected, to each heat source 1 that has outputted the rejected drive command. When the heat source 1 receives the rejection notification, the heat source 1 can output the drive command to the actuator 3 different from the actuator 3 that has outputted the rejection notification. Since a notification of drive command rejection is sent from the actuator 3 to the heat source 1, the heat source 1 can execute an alternative method for achieving the heat amount distributed from the heat amount distributor 2.

The actuator 3 outputs a drive amount thereof to the heat source 1 that has outputted the drive command thereto, and the heat source 1 can output an actual supplied heat amount calculated on the basis of the drive amount acquired from the actuator 3, to the heat amount distributor 2. Since an actual supplied heat amount is fed back from the heat source 1 to the heat amount distributor 2, the heat amount distributor 2 can manage whether the heat amount distributed initially to each heat source 1 has been achieved.

The heat amount distributor 2 can correct the heat amount distributed to each heat source 1, on the basis of the actual supplied heat amount received from each heat source 1. Since the heat amount distributed to each heat source 1 is corrected on the basis of the actual supplied heat amount of each heat source 1, even when each heat source 1 has failed to supply the heat amount demanded from the heat amount distributor 2 due to certain factors, the demanded heat amount can be re-distributed to each heat source 1.

Second Embodiment

<Configuration>

Figure 3:
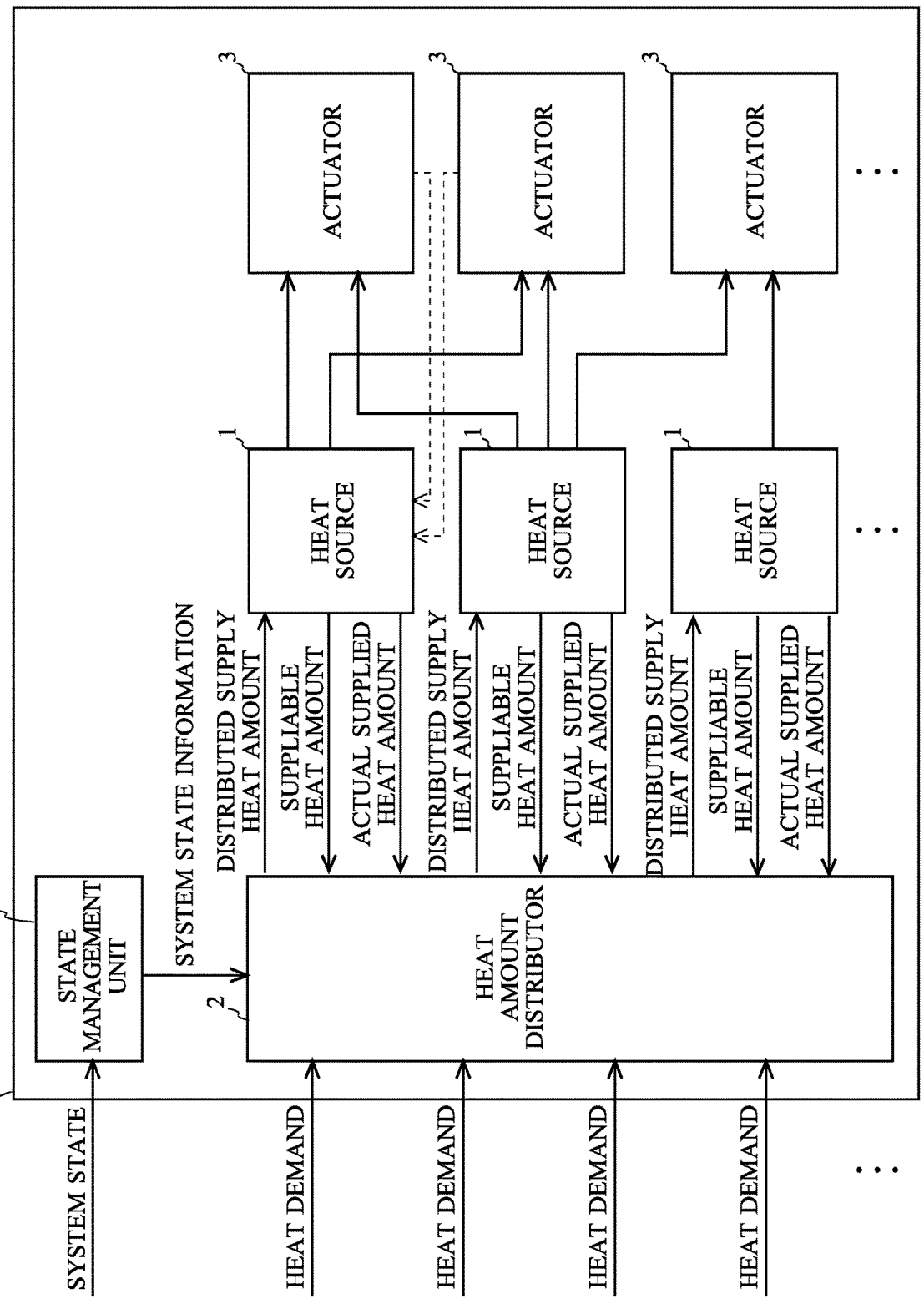
FIG. 3 is a functional block diagram showing a schematic configuration of a thermal energy control system according to a second embodiment.

FIG. 3 is a functional block diagram showing a schematic configuration of a thermal energy control system according to a second embodiment. Hereinafter, the differences between the present embodiment and the first embodiment will be mainly described.

The thermal energy control system 20 according to the present embodiment is obtained by further adding a state management unit 4 to the thermal energy control system 10 according to the first embodiment.

The state management unit 4 can acquire and manage a state of the vehicle or a state of the external environment (hereinafter, these states are collectively referred to as "system state"), and select a more preferable heat path in the vehicle on the basis of the acquired system state. For example, when the state management unit 4 acquires a system state that is a state where the engine is being warmed up, the state management unit 4 selects a path shorter than that during non-warming-up, as a path for the cooling water for the engine, in order to promote warming-up of the engine. The state management unit 4 outputs the selected more preferable heat path as system state information to the heat amount distributor 2.

The state of the vehicle refers to a state representing how the vehicle is operating, and the state of the external environment refers to a state representing in what external environment the vehicle is present. The state of the vehicle included in the system state includes a state where the engine is being warmed up, a state where the vehicle is running, a state where the vehicle is stopped, a state where a hybrid vehicle is running with an engine thereof, a state where a hybrid vehicle is running electrically with a traction motor thereof, a state where the vehicle is running in an energy-saving mode, etc. In addition, the state of the external environment includes a state where the vehicle is used in a specific season, a state where the vehicle is used in a cold climate area, etc.

The heat amount distributor 2 distributes a supply heat amount to each heat source 1, and also corrects the distributed heat amount, on the basis of the system state information outputted from the state management unit 4. For example, the case is assumed in which a heat demand for heating the interior of the vehicle is made by the air-conditioner while the engine is being warmed up and when the path for the cooling water for promoting warming-up of the engine has been selected. In this case, the heat amount distributor 2 determines that the state of the vehicle is a state where warming-up of the engine is being promoted, on the basis of the system state information, and can distribute the heat amount demanded from the air-conditioner, to another heat source 1.

A control process according to the present embodiment can be realized by further adding a step of the state management unit 4 acquiring the system state and a step of the state management unit 4 outputting the system state information to the heat amount distributor 2, to the control sequence shown in FIG. 2. The heat amount distributor 2 reflects the system state information acquired from the state management unit 4, in the distribution process in step S3 and the correction process in step S14 in FIG. 2.

Advantageous Effects, Etc.

As described above, the thermal energy control system 20 according to the present embodiment includes the state management unit 4 which acquires and manages the system state (the state of the vehicle or the state of the external environment), and the heat amount distributor 2 can correct the heat amount distributed to each heat source 1, on the basis of the system state acquired by the state management unit 4. According to this configuration, more efficient heat management can be performed in the entire vehicle in consideration of the system state.

(Modifications)

In the above first embodiment, the heat path selection may be performed by the heat amount distributor 2. In this case, information representing one or more heat paths through which thermal energy can be transmitted between the heat sources 1 included in the vehicle is prepared in accordance with the configuration of the heat sources 1 and the actuators 3 included in the vehicle, and the heat amount distributor 2 can select a more preferable heat path (transmission path for thermal energy) by referring to the heat path information. In the case where the heat amount distributor 2 can select a heat path, the heat amount distributor 2 can assign a demanded heat amount to each heat source on the basis of the information of the selected or switched heat path in addition to the heat demands and the achievable heat amount and the actual generated heat amount of each heat source 1. For example, when a heat demand made for warming up the engine cannot be satisfied by only drive of the engine, and there is a margin for a supply heat amount in another heat source 1 such as a heat pump, the heat amount distributor 2 can select a heat path through which thermal energy is transmitted from the other heat source 1 such as a heat pump to the engine, on the basis of the heat path information, and assign a heat amount lacked for warming-up of the engine, to the other heat source 1. In this case, the heat amount distributor 2 may further switch the heat path. In this case, information representing the operating state of each actuator 3 for achieving the heat path included in the above heat path information is prepared in accordance with the configuration of the heat sources 1 and the actuators 3 included in the vehicle, and the actuator 3 is directly or indirectly switched by referring to the information about the operating state of the actuator 3, whereby the present heat path can be switched to a preferable heat path (transmission path for thermal energy). In the above second embodiment, the heat path switching process may be performed by the state management unit 4.

The heat path selection or switching (control of the actuators 3) may be performed by a configuration other than the thermal energy control systems 10 and 20 according to the above respective embodiments.

The present disclosure can be used for a system that optimizes, in the entirety of a vehicle, distribution of thermal energy emitted from a plurality of heat sources included in the vehicle.

What is claimed is:

1. A thermal energy control system provided in a vehicle, the thermal energy control system comprising:
   a plurality of heat sources, the plurality of heat sources each comprising at least one of a heat generator and heat exchanger; and
   a heat amount distributor comprising a hardware processor or dedicated circuitry and configured to assign a demanded heat amount calculated from a heat demand generated in an entirety of the vehicle, to the plurality of heat sources on the basis of a suppliable heat amount, the suppliable heat amount being a maximum heat amount that each of the plurality of heat sources can supply,
   wherein a priority is set for the heat demand generated in the entirety of the vehicle, and
   when a total amount of the suppliable heat amounts of the plurality of heat sources is smaller than the demanded heat amount, the heat amount distributor cancels a heat demand for which a relatively low priority is set.

2. The thermal energy control system according to claim 1, wherein the heat demand generated in the entirety of the vehicle includes heat demands generated with operation of an engine, a traction motor, a power controller for the traction motor, an air conditioner, and a drive battery for the traction motor.

3. The thermal energy control system according to claim 1, further comprising a plurality of drive devices each comprising an actuator and configured to be driven on the basis of a drive command outputted from at least one of the plurality of heat sources and capable of controlling a heat amount supplied by the at least one of the plurality of heat sources that has outputted the drive command, wherein
   a degree of freedom is set for each of drive commands outputted to the plurality of drive devices by the plurality of heat sources, and
   when at least one of the plurality of drive devices receives drive commands from two or more of the heat sources, and the received drive commands cannot be carried out at the same time, the at least one of the plurality of drive devices operates on the basis of the drive command for which a lowest degree of freedom is set, and rejects the other drive commands.

4. The thermal energy control system according to claim 3, wherein
   the at least one of the plurality of drive devices outputs a rejection notification indicating the drive command has been rejected, to each heat source of the plurality of heat sources that has outputted the rejected drive command, and
   when the each heat source of the plurality of heat sources receives the rejection notification, the each heat source of the plurality of heat sources outputs a drive command to one other of the plurality of drive devices different from the at least one of the plurality of drive devices that has outputted the rejection notification.

5. The thermal energy control system according to claim 3, wherein
   the plurality of drive devices output a drive amount thereof to the plurality of heat sources that have outputted the drive command thereto, and
   the plurality of heat sources output an actual supplied heat amount calculated on the basis of the drive amount acquired from the plurality of drive devices, to the heat amount distributor.

6. The thermal energy control system according to claim 5, wherein the heat amount distributor corrects a heat amount assigned to each of the plurality of the heat sources, on the basis of an actual supplied heat amount received from each of the plurality of heat sources.

7. The thermal energy control system according to claim 1, further comprising a second hardware processor programmed to function as a state management unit configured to acquire and manage a state of the vehicle or a state of an external environment, wherein
   the heat amount distributor corrects a heat amount assigned to each of the plurality of the heat sources on the basis of the state of the vehicle or the state of the external environment acquired by the state management unit.

8. The thermal energy control system according to claim 1, wherein the suppliable heat amount is calculated on the basis of an operating state of each of the plurality of heat sources.

9. The thermal energy control system according to claim 1, further comprising a plurality of drive devices each configured to be driven on the basis of a drive command outputted from at least one of the plurality of heat sources and capable of controlling a heat amount supplied by the at least one of the heat sources that has outputted the drive command,
   wherein the suppliable heat amount is calculated on the basis of an operating state of each of the plurality of heat sources.

10. A heat amount distributor provided in a vehicle, wherein the heat amount distributor is configured to:
    assign a demanded heat amount calculated from a heat demand generated in an entirety of the vehicle, to a plurality of heat sources on the basis of a suppliable heat amount, the suppliable heat amount being a maximum heat amount that each of the plurality of heat sources can supply, a priority being set for the heat demand generated in the entirety of the vehicle; and cancel a heat demand when (a) the set priority is a relatively low priority, and (b) a total amount of the suppliable heat amounts of the plurality of heat sources is smaller than the demanded heat amount.

11. A thermal energy control method for a vehicle, the thermal energy control method comprising:

assigning a demanded heat amount calculated from a heat demand generated in an entirety of the vehicle, to a plurality of heat sources on the basis of a suppliable heat amount, the suppliable heat amount being a maximum heat amount that each of the plurality of heat sources can supply, a priority being set for the heat demand generated in the entirety of the vehicle; and canceling a heat demand when (a) the set priority is a relatively low priority, and (b) a total amount of the suppliable heat amounts of the plurality of heat sources is smaller than the demanded heat amount.

* * * * *